(12) United States Patent
Katsukura et al.

(10) Patent No.: US 11,973,351 B2
(45) Date of Patent: Apr. 30, 2024

(54) POWER CONVERTER

(71) Applicant: TOSHIBA MITSUBISHI-ELECTRIC INDUSTRIAL SYSTEMS CORPORATION, Chuo-ku (JP)

(72) Inventors: Tomoya Katsukura, Tokyo (JP); Yoshihiro Tawada, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 100 days.

(21) Appl. No.: 17/754,539

(22) PCT Filed: Dec. 12, 2019

(86) PCT No.: PCT/JP2019/048741
§ 371 (c)(1),
(2) Date: Apr. 5, 2022

(87) PCT Pub. No.: WO2021/117192
PCT Pub. Date: Jun. 17, 2021

(65) Prior Publication Data
US 2023/0318305 A1 Oct. 5, 2023

(51) Int. Cl.
*H02J 3/38* (2006.01)
*H02J 3/16* (2006.01)
(Continued)

(52) U.S. Cl.
CPC ............... *H02J 3/381* (2013.01); *H02J 3/16* (2013.01); *H02J 3/46* (2013.01); *H02M 1/0009* (2021.05); *H02M 1/143* (2013.01); *H02J 2300/24* (2020.01)

(58) Field of Classification Search
CPC .... H02J 2300/24; H02J 2300/22; H02J 3/381; H02J 3/16
See application file for complete search history.

(56) References Cited

U.S. PATENT DOCUMENTS

| 2002/0044581 A1 | 4/2002 | Kaneko et al. |
| 2016/0233787 A1* | 8/2016 | Matsuoka ............. H02J 3/1842 |
| 2020/0044581 A1 | 2/2020 | Tanaka et al. |

FOREIGN PATENT DOCUMENTS

| JP | 2013-150369 A | 8/2013 |
| JP | 5422466 B2 | 2/2014 |

(Continued)

OTHER PUBLICATIONS

Albuquerque, F. L., et al. "Optimization of a photovoltaic system connected to electric power grid." 2004 IEEE/PES Transmision and Distribution Conference and Exposition: Latin America (IEEE Cat. No. 04EX956). IEEE, 2004. (Year: 2004).*

(Continued)

*Primary Examiner* — Ryan Johnson
(74) *Attorney, Agent, or Firm* — Oblon, McClelland, Maier & Neustadt, L.L.P.

(57) ABSTRACT

A power converter includes a power conversion circuit including a direct-current terminal connected to a solar cell panel, and an alternating-current terminal connected to an alternating-current power system, the power conversion circuit being configured to convert direct-current power generated by the solar cell panel into alternating-current power and to supply the alternating-current power to the alternating-current power system; a current detection unit configured to detect a direct current flowing between the solar cell panel and the power converter; and a control circuit including a power generation mode in which the control circuit controls the power conversion circuit to output active power generated from the direct-current power generated by the solar cell panel to the alternating-current power system, and a reactive power compensation mode in which the control circuit controls the power conversion (Continued)

circuit to output reactive power to the alternating-current power system.

4 Claims, 4 Drawing Sheets

(51) Int. Cl.
    *H02J 3/46*     (2006.01)
    *H02M 1/00*     (2006.01)
    *H02M 1/14*     (2006.01)

(56) References Cited

FOREIGN PATENT DOCUMENTS

JP           6462969 B2    1/2019
WO    WO 2018/078683 A1    5/2018

OTHER PUBLICATIONS

Indian Office Action dated Aug. 8, 2022 in Indian Patent Application No. 202217020002, 6 pages.
Indian Office Action issued Jan. 9, 2024, in Indian Patent Application No. 202217020002, therein, 2 total pages.

* cited by examiner

POWER CONVERTER

FIELD

The present application relates to a power converter.

BACKGROUND

For example, as disclosed in JP 6462969 B, a power converter that switches operation of a power conversion circuit based on a direct-current voltage from a direct-current power supply has been known. According to paragraph 0043 in the patent publication, it is determined as sunset in a case where the direct-current voltage becomes lower than a lower limit voltage, and thereafter, an SVC operation mode is started. As a result, reactive power compensation at night is performed.

CITATION LIST

Patent Literature

[PTL 1] JP 6462969 B

SUMMARY

Technical Problem

An output direct-current voltage of a solar cell panel is drastically reduced when the solar cell panel is obscured by clouds in the daytime. In the above-described existing technology, when such voltage reduction occurs, it may be erroneously determined as sunset. When sunset determination accuracy is low, an operation mode may be switched to the reactive power compensation mode even though a normal power generation mode should be maintained.

Further, determination of sunrise has a similar issue. In a case where the solar cell panel is obscured by clouds and the output direct-current voltage is insufficient even after a sunrise time has passed, it may be erroneously determined still as night. Also in a case where sunrise determination accuracy is low, the mode may not be appropriately switched.

The present application is intended to solve the above-described issues, and an object of the present application is to provide a power converter improved so as to appropriately perform mode switching corresponding to a power generation state of a solar cell panel.

Solution to Problem

A power converter according to the present application includes a power conversion circuit including a direct-current terminal connected to a solar cell panel, and an alternating-current terminal connected to an alternating-current power system, the power conversion circuit being configured to convert direct-current power generated by the solar cell panel into alternating-current power and to supply the alternating-current power to the alternating-current power system; a current detection unit configured to detect a direct current flowing between the solar cell panel and the power conversion circuit; and a control circuit including a power generation mode in which the control circuit controls the power conversion circuit to output active power of the direct-current power generated by the solar cell panel to the alternating-current power system, and a reactive power compensation mode in which the control circuit controls the power conversion circuit to output reactive power to the alternating-current power system, the control circuit being configured to perform mode switching between the power generation mode and the reactive power compensation mode based on a magnitude of the direct current detected by the current detection unit.

The control circuit may perform at least one of "sunset determination" and "sunrise determination" based on the magnitude of the direct current. The mode switching may include at least one of "sunset mode switching" in which the mode is switched from the power generation mode to the reactive power compensation mode, and "sunrise mode switching" in which the mode is switched from the reactive power compensation mode to the power generation mode. The control circuit may perform the sunset mode switching based on a result of the sunset determination. The control circuit may perform the sunrise mode switching based on a result of the sunrise determination.

Advantageous Effects of Invention

According to the present application, the power generation state of the solar cell panel can be accurately determined based on the magnitude of the direct current from the solar cell panel. Accordingly, the mode can be appropriately switched.

DESCRIPTION OF EMBODIMENTS

Configurations of Apparatus and System of Embodiment

Figure 1:
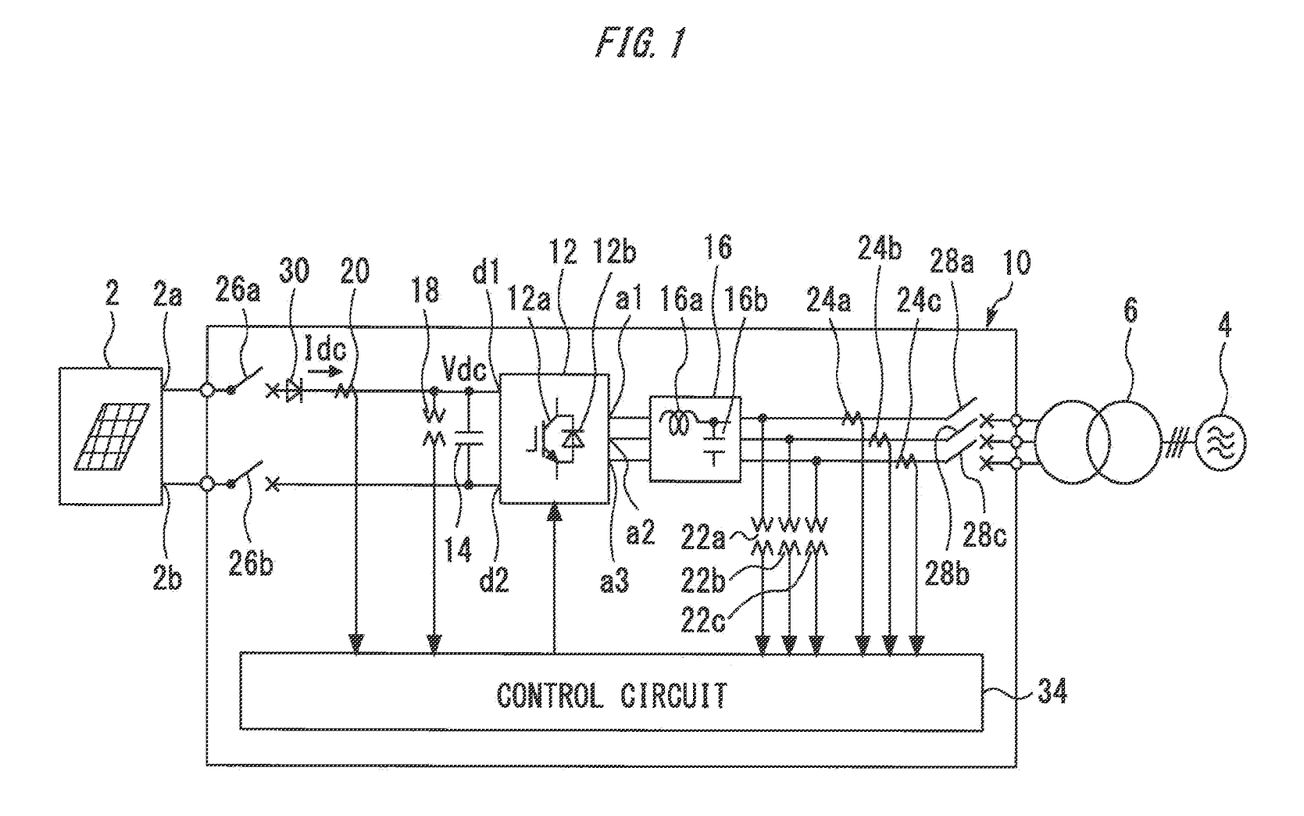
FIG. 1 is a block diagram schematically illustrating a power converter according to an embodiment.

FIG. 1 is a block diagram schematically illustrating a power converter according to an embodiment. As illustrated in FIG. 1, a power converter 10 includes a power conversion circuit 12, a direct-current capacitor 14, a filter circuit 16, a direct-current voltage detector 18, a direct current detector 20, a plurality of alternating-current voltage detectors 22a to 22c, a plurality of alternating current detectors 24a to 24c, a plurality of direct-current switches 26a and 26b, a plurality of alternating-current switches 28a to 28c, a rectifying device 30, and a control circuit 34.

The power converter 10 is connected to a solar cell panel 2 as a direct-current power supply, and an alternating-current power system 4. The power converter 10 is connected to the power system 4 through, for example, a transformer 6. The solar cell panel 2 supplies direct-current power to the power converter 10. The power converter 10 converts the direct-current power input from the solar cell panel 2 into alternating-current power, and supplies the converted alternating-current power to the power system 4.

The power converter 10 supplies active power and a certain amount of reactive power to the power system 4. For example, the power converter 10 causes the solar cell panel 2 to function as a distributed power supply. Further, the power converter 10 supplies the reactive power to the power system 4, thereby performing reactive power compensation to suppress voltage fluctuation of the power system 4. The power converter 10 performs operation to supply the active power and a certain amount of reactive power in a time period during which a power generation amount of the solar cell panel 2 is high, for example, in the daytime. Further, the power converter 10 performs operation to supply the reactive power in a time period during which the power generation amount of the solar cell panel 2 is low, for example, in the nighttime.

As described above, the power converter 10 includes "power generation operation mode" in which the power converter 10 supplies the active power and a certain amount of reactive power to the power system 4, and "reactive power compensation mode" in which the power converter 10 supplies the reactive power to the power system 4. The reactive power compensation mode is also referred to as SVC (Static Var Compensator) operation mode.

In this example, the solar cell panel 2 is described as the direct-current power supply. In this example, the alternating-current power of the power system 4 is three-phase alternating-current power. The power converter 10 converts the direct-current power into the three-phase alternating-current power, and supplies the three-phase alternating-current power to the power system 4. The alternating-current power of the power system 4 is not limited to the three-phase alternating-current power, and may be single-phase alternating-current power or the like. The alternating-current voltage of the power system 4 may be, for example, 100 V (effective value). A frequency of the alternating-current power of the power system 4 may be, for example, 50 Hz or 60 Hz.

The power conversion circuit 12 includes paired direct-current terminals d1 and d2 connected to the solar cell panel 2, and a plurality of alternating-current terminals a1 to a3 connected to the power system 4. The direct-current terminal d1 is a high-voltage side direct-current terminal, and the direct-current terminal d2 is a low-voltage side direct-current terminal. In contrary thereto, the direct-current terminal d1 may be a low-voltage side direct-current terminal, and the direct-current terminal d2 may be a high-voltage side direct-current terminal.

In this example, the power conversion circuit 12 includes three alternating-current terminals a1 to a3 corresponding to each of phases of the three-phase alternating-current power. For example, in a case where the alternating-current power of the power system 4 is single-phase alternating-current power, the number of alternating-current terminals may be two. The number of alternating-current terminals may be appropriately set based on a format of the alternating current-power, or the like.

The power conversion circuit 12 converts the direct-current power of the solar cell panel 2 into the alternating-current power corresponding to the power system 4, and supplies the alternating-current power to the power system 4. The power conversion circuit 12 includes, for example, a plurality of switching devices 12a, and a plurality of rectifying devices 12b that are connected in reverse parallel to the respective switching devices 12a. The power conversion circuit 12 converts the direct-current power into the alternating-current power by turning on/off of each of the switching devices 12a. The power conversion circuit 12 is a so-called three-phase voltage inverter.

The power conversion circuit 12 includes, for example, six switching devices 12a that are three-phase bridge-connected to one another, and converts the direct-current power into the three-phase alternating-current power by turning on/off of each of the switching devices 12a. As each of the switching devices 12a, for example, a self-arc-extinguishing semiconductor device such as a GTO (Gate Turn-Off thyristor) and an IGBT (Insulated Gate Bipolar Transistor).

The direct-current capacitor 14 is connected between the paired direct-current terminals d1 and d2. For example, the direct-current capacitor 14 smooths the direct-current voltage of the solar cell panel 2. In other words, the direct-current capacitor 14 is a smoothing capacitor.

The filter circuit 16 is provided between the alternating-current terminals a1 to a3 and the power system 4. The filter circuit 16 is connected to the alternating-current terminals a1 to a3. The filter circuit 16 includes, for example, an inductor 16a and a capacitor 16b. For example, the inductor 16a and the capacitor 16b are provided for each phase of the alternating-current power. The filter circuit 16 suppresses harmonic components of the alternating-current power output from the power conversion circuit 12, and brings an output waveform close to a sine wave.

The direct-current voltage detector 18 detects a direct-current voltage value $V_{dc}$ of the direct-current capacitor 14. In other words, the direct-current voltage detector 18 detects a voltage value of the direct-current voltage of the solar cell panel 2. Further, the direct-current voltage detector 18 is connected to the control circuit 34, and provides the detected direct-current voltage value $V_{dc}$ to the control circuit 34.

The direct current detector 20 is provided between the solar cell panel 2 and the power conversion circuit 12. The direct current detector 20 detects a direct current value $I_{dc}$ that represents a magnitude of the direct current input to the power conversion circuit 12. The direct current detector 20 is connected to the control circuit 34, and provides the detected current value to the control circuit 34.

The alternating-current voltage detectors 22a to 22c are respectively connected to the alternating-current terminals a1 to a3 through the filter circuit 16. The alternating-current voltage detectors 22a to 22c each detect a voltage value of the alternating-current power output from the power conversion circuit 12. In other words, the alternating-current voltage detectors 22a to 22c each detect the voltage value of the alternating-current voltage of the power system 4. The alternating-current voltage detectors 22a to 22c detect, for example, voltage values (phase voltages) of the respective phases of the three-phase alternating-current power. The alternating-current voltage detectors 22a to 22c are connected to the control circuit 34, and each provide the detected voltage value to the control circuit 34.

The alternating current detectors 24a to 24c are provided between the filter circuit 16 and the power system 4. The alternating current detectors 24a to 24c each detect a current value of the alternating-current power output from the power conversion circuit 12. In other words, the alternating current detectors 24a to 24c each detect the current value of the alternating current of the power system 4. The alternating current detectors 24a to 24c detect current values (phase currents) of the respective phases of the three-phase alternating-current power. The alternating current detectors 24a to 24c are connected to the control circuit 34, and each provide the detected current value to the control circuit 34.

The direct-current switches 26a and 26b are provided between the solar cell panel 2 and the power conversion circuit 12. Each of the direct-current switches 26a and 26b may be, for example, of a manual type. The direct-current switches 26a and 26b are normally in a closed state, and are automatically opened by action of the control circuit 34 or the like when any abnormality occurs.

The alternating-current switches 28a to 28c are provided between the power system 4 and the power conversion circuit 12. In a case where it is determined that the voltage values detected by the alternating-current voltage detectors 22a to 22b and the terminal voltages on the power converter side of the transformer 6 by transformer-side voltage detectors (not illustrated) are equal to each other within a predetermined range, the alternating-current switches 28a to 28c are automatically closed by, for example, action of the control circuit 34.

The direct-current switches 26a and 26b and the alternating-current switches 28a to 28c are opened, for example, in maintenance, and the power conversion circuit 12 is disconnected from the solar cell panel 2 and the power system 4 by the opening. When the direct-current switches 26a and 26b and the alternating-current switches 28a to 28c are closed, the power conversion circuit 12 is connected to the solar cell panel 2 and the power system 4.

The rectifying device 30 is provided between the direct-current capacitor 14 and the solar cell panel 2. The rectifying device 30 is, for example, a backflow prevention diode. An anode of the rectifying device 30 is connected to the high-voltage side output terminal 2a of the solar cell panel 2 through the direct-current switch 26a. A cathode of the rectifying device 30 is connected to the high-voltage side direct-current terminal d1 of the power conversion circuit 12. Accordingly, the rectifying device 30 prevents backflow of the power from the power conversion circuit 12 and the direct-current capacitor 14 to the solar cell panel 2. The rectifying device 30 may be provided on the low-voltage side output terminal 2b of the solar cell panel 2 and the low-voltage side direct-current terminal d2 of the power conversion circuit 12.

The control circuit 34 control the operation of the power conversion circuit 12. The control circuit 34 controls power conversion by the power conversion circuit 12. The control circuit 34 is connected to, for example, a gate signal terminal of each of the switching devices 12a. The control circuit 34 controls the power conversion by the power conversion circuit 12 by controlling turning on/off of each of the switching devices 12a.

The control circuit 34 performs operation in the "power generation operation mode" and operation in the "SVC operation mode".

(Power Generation Operation Mode)

In the power generation operation mode, for example, the control circuit 34 controls turning on/off of each of the switching devices 12a of the power conversion circuit 12 such that the power conversion circuit 12 converts the power into the alternating-current power synchronized with the alternating-current power of the power system 4. For example, the control circuit 34 detects a voltage, a frequency, a phase, and the like of the alternating-current power of the power system 4 based on detection results of the alternating-current voltage detectors 22a to 22c and the alternating current detectors 24a to 24c, and adjusts the voltage, the frequency, the phase, and the like of the alternating-current power converted by the power conversion circuit 12, to those of the alternating-current power of the power system 4. As a result, the alternating-current power converted by the power conversion circuit 12 is output as the active power to the power system 4.

Further, in the power generation operation mode, for example, the control circuit 34 performs MPPT (Maximum Power Point Tracking) control that causes the direct-current power to track the maximum power point of the solar cell panel 2. The control circuit 34 extracts the maximum power point (optimum operation point) of the solar cell panel 2 based on, for example, the direct-current voltage value $V_{dc}$ of the direct-current capacitor 14 detected by the direct-current voltage detector 18 and the current value of the direct current detected by the direct current detector 20. The control circuit 34 controls the operation of the power conversion circuit 12 based on the extracted maximum power point.

(Reactive Power Compensation Mode, i.e., SVC Operation Mode)

In the reactive power compensation mode (i.e., SVC operation mode), the control circuit 34 determines the reactive power to be output from the power conversion circuit 12 to the power system 4. The reactive power is determined based on, for example, the detection results of the alternating-current voltage detectors 22a to 22c and the alternating current detectors 24a to 24c. The control circuit 34 controls turning on/off of each of the switching devices 12a of the power conversion circuit 12 based on the determined reactive power. By the turning on/off control, the alternating-current power converted by the power conversion circuit 12 is output as the reactive power to the power system 4. This makes it possible to control, for example, the reactive power of the power system 4, and to enhance, for example, stability of the power system 4.

In the SVC operation mode, the direct-current voltage of the direct-current capacitor 14 is converted into the alternating-current voltage by the power conversion circuit 12. Further, in the SVC operation mode, the direct-current capacitor 14 is charged from the power system 4 side through turning on/off of each of the switching devices 12a of the power conversion circuit 12. In the SVC operation mode, the control circuit 34 controls turning on/off of each of the switching devices 12a of the power conversion circuit 12 such that the voltage value of the direct-current capacitor 14 is substantially fixed to a predetermined value. In the SVC operation mode, the control circuit 34 may control the active power in a direction in which the active power is supplied from the power system 4 to the direct-current capacitor 14 in order to maintain the direct-current capacitor voltage, but may not control the active power in a direction in which the active power is not supplied from the direct-current capacitor 14 to the power system 4.

In the SVC operation mode according to the embodiment, the active power is not supplied from the power conversion circuit 12 to the power system 4. In the SVC operation mode, the control circuit 34 may control the operation of the power conversion circuit 12 such that the direct-current voltage value $V_{dc}$ of the direct-current capacitor 14 is substantially fixed to a predetermined voltage $V_{SVC}$. For example, the predetermined voltage $V_{SVC}$ may be set between an upper limit voltage $V_{max\_mpp}$ and a lower limit voltage $V_{min\_mpp}$ of the MPPT control. Further, in the SVC operation mode, the control circuit 34 may compensate voltage reduction of the direct-current capacitor 14 due to occurrence of a loss caused by the operation of the power conversion circuit 12, and may take in a certain amount of active power from the power system 4 to the power conversion circuit 12 in order to maintain the predetermined voltage $V_{SVC}$.

As a modification, the rectifying device 30 that prevents backflow of the power to the solar cell panel 2 may be a thyristor in place of the backflow prevention diode. In the modification, a gate terminal of the thyristor is connected to the control circuit 34. The control circuit 34 can prevent backflow of the power to the solar cell panel 2 by controlling turning on/off of the thyristor. The rectifying device 30 may be an optional device that can supply the direct-current power from the solar cell panel 2 to the power conversion circuit 12 and can prevent backflow of the power to the solar cell panel 2.

Specific Processing of Embodiment

Figure 2:
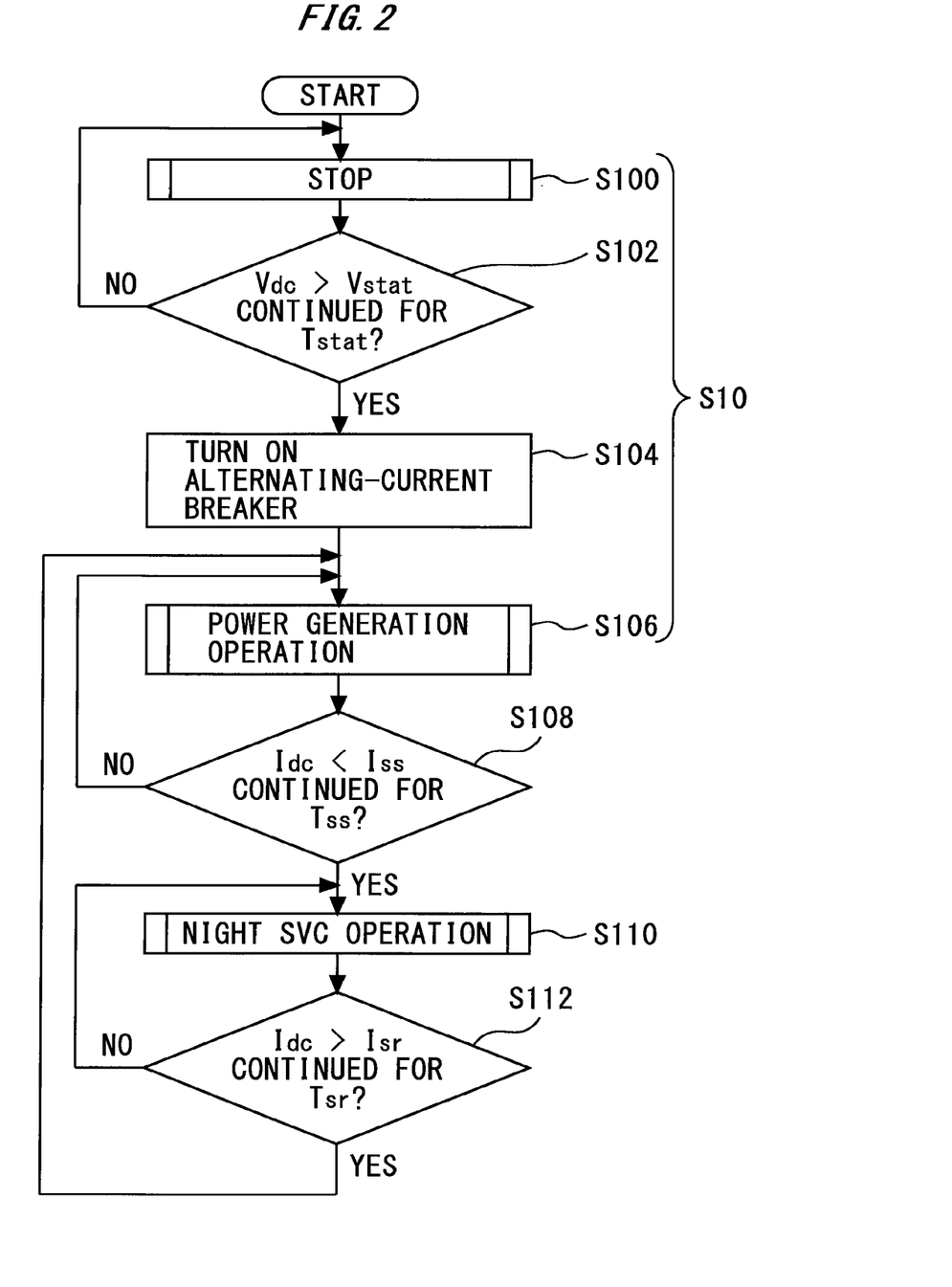
FIG. 2 is a flowchart schematically illustrating operation of the power converter according to the embodiment.

FIG. 2 is a flowchart schematically illustrating the operation of the power converter 10 according to the embodiment. A routine in FIG. 2 is executed by the control circuit 34. The routine in FIG. 2 may be executed in first operation after the power converter 10 is installed, or may be executed in reactivation after the power converter 10 is temporarily stopped for maintenance or the like.

Note that FIG. 2 illustrates an operation sequence for, for example, a real machine having a direct-current voltage capacity of 1500 V. Specific numerals illustrated in each of the following steps may be applied in a case where the power converter 10 has the capacity of at least 1500 V.

At start of the routine in FIG. 2, the alternating-current breakers 28a to 28c are turned off (opened), and the direct-current breakers 26a and 26b are turned on (closed). The direct-current breakers 26a and 26b are turned on (closed) at least before step S102 arrives.

In the routine in FIG. 2, the processing first progresses while the power conversion circuit 12 of the power converter 10 is stopped (step S100).

Next, "activation determination" is performed (step S102). The activation determination is determination whether to start the operation of the power conversion circuit 12, based on the magnitude of the direct-current voltage value $V_{dc}$. In the activation determination, a length of a time period during which the direct-current voltage value $V_{dc}$ exceeds a predetermined activation determination voltage value $V_{stat}$ is measured, and it is determined whether the measured time length reaches a predetermined activation determination time $T_{stat}$. More specifically, in the embodiment, the activation determination voltage value $V_{stat}$ is, for example, 1000 V, and the activation determination time $T_{stat}$ is, for example, two seconds. Therefore, in a case where a time period during which "$V_{dc}$>1000 V" is established is continued for two seconds, a result of the determination in step S102 is affirmative (YES). The power conversion circuit 12 is stopped in a period during which the result of the determination in step S102 is negative (NO).

When the result of the determination in step S102 is affirmative, the alternating-current breakers 28a to 28c are then turned on (closed) (step S104).

Next, the power generation operation is started (step S106). In this step, the control circuit 34 drives the power conversion circuit 12 to realize the operation in the power generation operation mode.

In the embodiment, the series of processing in steps S100 to S106 described above is also referred to as an activation routine (step S10).

Next, "sunset determination" is performed (step S108). In the sunset determination, it is determined whether the sunset has arrived based on the magnitude of the direct current value $I_{dc}$. More specifically, in the processing in step S108, a length of a time period during which the direct current value $I_{dc}$ is lower than a predetermined sunset determination current value $I_{ss}$ is measured, and it is determined whether the measured time length has reached a predetermined sunset determination time $T_{ss}$. More specifically, in the embodiment, the sunset determination current value $I_{ss}$ is, for example, 1% of an input rated current of the power converter 10, and the sunset determination time $T_{ss}$ is, for example, 10 minutes. Therefore, in a case where the time period during which "$I_{dc}$<1% of input rated current" is established continues for ten minutes, a result of the determination in step S108 is affirmative (YES). The power conversion circuit 12 is continuously driven in the power generation operation mode in a period during which the result of the determination in step S108 is negative (NO).

After the result of the determination in step S108 becomes affirmative (YES), the control circuit 34 then drives the power conversion circuit 12 in the SVC operation mode in order to perform night SVC operation (step S110). In steps S108 and S110, the "sunset mode switching" in which the mode is switched from the power generation operation mode to the SVC operation mode is realized.

Next, "sunrise determination" is performed (step S112). In the sunrise determination, it is determined whether the sunrise has arrived based on the magnitude of the direct current value $I_{dc}$. More specifically, in the processing in step S112, a length of a time period during which the direct current value $I_{dc}$ exceeds a predetermined sunrise determination current value $I_{sr}$ is measured, and it is determined whether the measured time length has reached a predetermined sunrise determination time $T_{sr}$. More specifically, in the embodiment, the sunrise determination current value $I_{sr}$ is, for example, 3% of the input rated current of the power converter 10, and the sunrise determination time $T_{sr}$ is, for example, two seconds. Therefore, in a case where the time period during which "$I_{dc}$>3% of input rated current" is established continues for two seconds, a result of the determination in step S112 is affirmative (YES). The power conversion circuit 12 is continuously driven in the SVC operation mode in a period during which the result of the determination in step S112 is negative (NO).

Note that, in the above-described numerical examples of the embodiment, the sunrise determination current value $I_{sr}$ is set larger than the sunset determination current value $I_{ss}$ as an example, and the sunset determination time $T_{ss}$ is set longer than the sunrise determination time $T_{sr}$ as an example. However, the magnitude relationship may be reversed.

After the result of the determination in step S112 becomes affirmative (YES), the control circuit 34 then drives the power conversion circuit 12 in the power generation operation mode (step S106). In steps S112 and S108, the "sunrise mode switching" in which the mode is switched from the SVC operation mode to the power generation operation mode is realized.

Thereafter, the power converter 10 can repeatedly perform the mode switching with the lapse of time in order of "sunset, nighttime, sunrise, daytime, sunset, . . . ". If the power converter 10 is stopped due to occurrence of accident, failure, or maintenance, the routine in FIG. 2 is executed again when the power converter 10 is reactivated thereafter.

As described above, the control circuit 34 according to the embodiment performs the mode switching between the power generation mode and the reactive power compensation mode (SVC mode) based on the magnitude of the direct current value $I_{dc}$.

During the period from the sunrise to the daytime, the output direct current of the solar cell panel 2 maintains a certain magnitude even when the solar cell panel 2 is obscured by clouds. Even when the solar cell panel 2 is obscured by clouds, the solar cell panel 2 can output the direct current of, for example, about 10% to 20% of the rated current. On the other hand, the magnitude of the output direct current of the solar cell panel 2 becomes very small when the sunset arrives, and becomes zero at night. From these circumstances, the magnitude of the direct current value $I_{dc}$ advantageously facilitates distinction between the sunrise and the sunset. In this respect, according to the embodiment, the power generation state of the solar cell panel 2 can be accurately determined based on the magnitude of the output direct current from the solar cell panel 2, which makes it possible to appropriately performs the mode switching in response to transition of the sunset, the nighttime, and the sunrise.

Further, in the embodiment, the control circuit 34 performs the mode switching based on the length of the time period during which the direct current value $I_{dc}$ is lower than the sunset determination current value $I_{ss}$ in step S108. At this time, a current flowing from the solar cell panel 2 to the power conversion circuit 12 is regarded as a plus current, and the reverse current is regarded as a minus current.

If the rectifying device 30 is not provided, the reverse current flows when direct current ground fault occurs in the daytime. For example, the direct current ground fault occurs between the solar cell panel 2 and each of the direct-current switches 26a and 26b. To distinguish the direction of the current, the direct current detector 20 detects the magnitude of the reverse current as a minus value in some cases. In a case where a mode switching determination value is determined as a small positive value to some extent, the determination logic of the control circuit 34 determines that the magnitude of the reverse current becomes lower than the mode switching determination value. The minus value is a value lower than zero. Therefore, when an absolute value of the magnitude of the reverse current is large to some extent, it is determined that the magnitude of the reverse current becomes lower than the mode switching determination value. This may lead to erroneous determination of the sunset. In this respect, combining the rectifying device 30 with the sunset determination logic based on the direct current value $I_{dc}$ makes it possible to prevent the reverse current of the power to the solar cell panel 2, as well as to surely prevent erroneous sunset detection when the direct-current ground fault occurs.

In particular, in the embodiment, in the case where the length of the time period during which the magnitude of the direct current value $I_{dc}$ is lower than the sunset determination current value $I_{ss}$ reaches the sunset determination time $T_{ss}$ in step S108, the control circuit 34 performs the mode switching.

In the embodiment, the sunset determination time $T_{ss}$ in step S108 is set to ten minutes as an example. The sunset determination time $T_{ss}$, however, may be changed to a predetermined time of two or more minutes. In practical use, the sunset determination with high accuracy can be performed by securing sufficient sunset determination time $T_{ss}$ of several minutes (i.e., two or more minutes). Note that the sunset determination time $T_{ss}$ may be set within a range from two minutes to ten minutes. This is because, when the sunset determination time $T_{ss}$ is excessively long, the time before the determination result is obtained becomes long. The sunset determination time $T_{ss}$ may be variably set.

Note that the sunset determination time $T_{ss}$ in step S108 may be set shorter than ten minutes, may be set to an optional time of, for example, 60 seconds to two minutes, or may be set to an optional time of two minutes to lower than 10 minutes. As described above, even when the solar cell panel 2 is obscured by clouds, the direct current value $I_{dc}$ has a certain magnitude. On the other hand, at the sunset, the output direct current of the solar cell panel 2 is largely reduced to almost zero. Therefore, in the case where the sunset determination is performed based on the direct current value $I_{dc}$, it is unnecessary to set the sunset determination time $T_{ss}$ of a long time.

Further, in the embodiment, the control circuit 34 includes the activation processing (step S100). The activation processing is to activate the power conversion circuit 12 when the voltage value of the direct-current capacitor 14 exceeds a predetermined activation determination value in the state where the power conversion circuit 12 is stopped.

The activation processing is performed at initial activation or at reactivation after the power converter 10 is installed. The reactivation is performed after the power converter 10 is stopped due to abnormality or maintenance.

In the activation processing (step S102) according to the embodiment, the determination is performed based not on the direct current but on the direct-current voltage. This is because the activation processing has different reasons in comparison between the sunset determination and the sunrise determination. One of the reasons is that, in a state where the direct-current switches 26a and 26b are closed in the daytime, the direct-current capacitor 14 is charged and the direct current does not flow, and accordingly, not the detection based on the direct current value $I_{dc}$ but the determination based on the direct-current voltage of the direct-current capacitor 14 is effective. Further, as the other reason, erroneous operation risk is low even by the direct-current voltage determination. The reason why the erroneous operation risk is low is because, even in the state where the direct-current switches 26a and 26b are closed at night, the voltage of the solar cell panel 2 is low at night, and accordingly, the direct-current voltage of the direct-current capacitor 14 does not exceed the activation determination value.

If the processing in step S102 is replaced with current determination processing, the direct current value $I_{dc}$ flowing into the direct-current capacitor 14 in response to the closing of the direct-current breakers 26a and 26b may be detected. When it is detected that the direct current value $I_{dc}$ exceeds the predetermined activation determination current $I_{stat}$, it may be determined as the sunrise or after.

Comparative Example: Related Art

Figure 3:
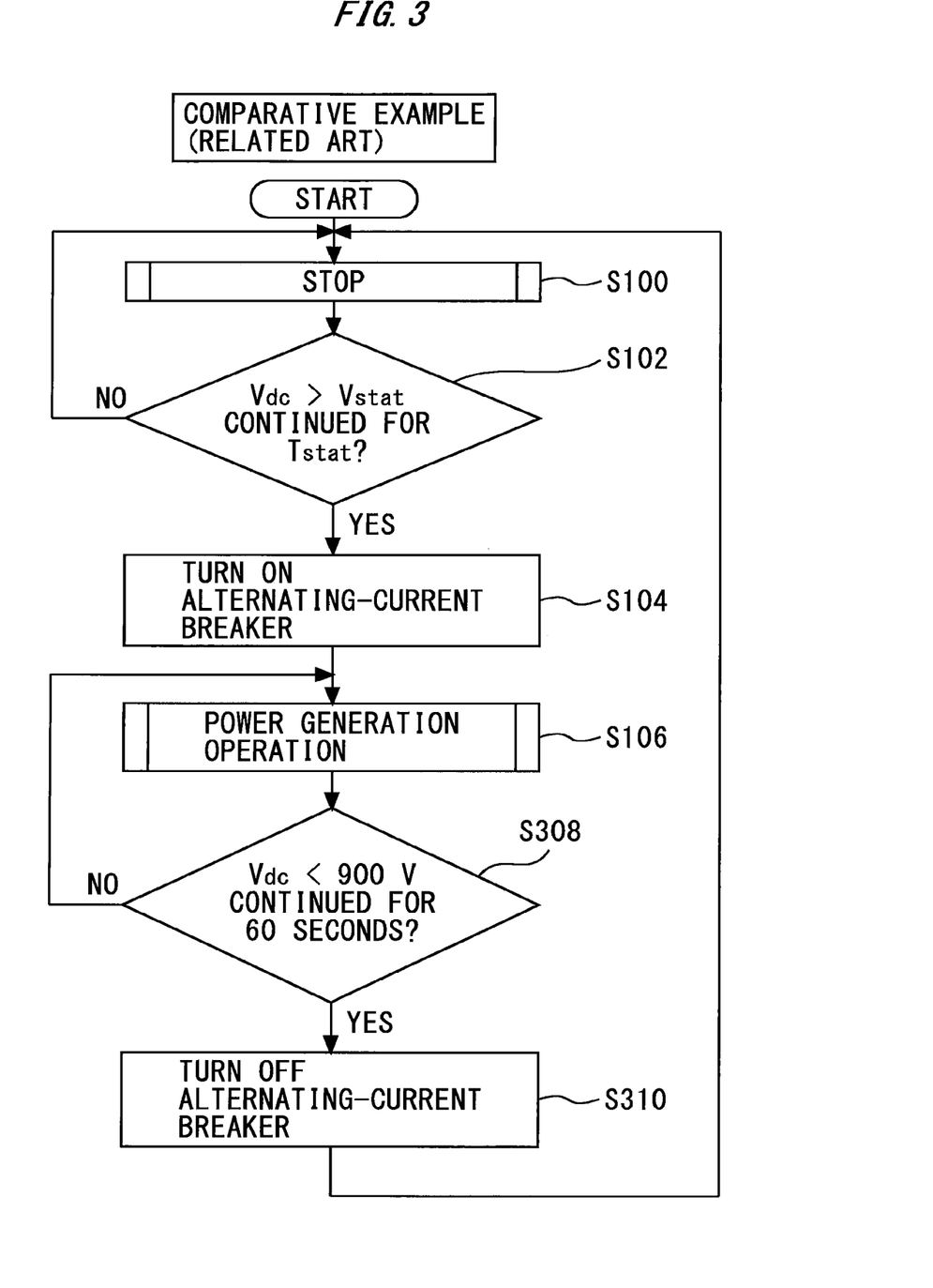
FIG. 3 is a flowchart schematically illustrating operation of a comparative example (related art) to explain effects by the power converter according to the embodiment.

FIG. 3 is a flowchart schematically illustrating operation of a comparative example (related art) to explain the effects by the power converter according to the embodiment. In a routine in FIG. 3, processing progresses in order of steps S100, S102, S104, and S106 as with the routine in FIG. 2.

In the routine in FIG. 3, the sunset determination based on the direct-current voltage value $V_{dc}$ is performed (step S308) after step S106. More specifically, in a case where a time period during which "$V_{dc}$<900 V" is established continues for 60 seconds, it is determined as the sunset. In a case where a result of the sunset determination is affirmative (YES), the alternating-current breakers 28a to 28c are turned off (step S310). Thereafter, the processing returns to step S100, and the power converter 10 is stopped. In other words, in the comparative example in FIG. 3, the night SVC operation is not performed.

Thereafter, the activation determination (step S102) is performed again. In the comparative example in FIG. 3, the processing in step S102 functions as the sunrise determination. When the sunrise arrives, the processing progresses in order of steps S102, S104, and S106, and the power generation operation is started.

In a case where the sunset determination based on the direct-current voltage value $V_{dc}$ as with the processing in step S308 is performed, the sunset determination time of about 60 seconds is extremely short. When the sunset determination time is extremely short, possibility of erroneous determination is increased. In this respect, in the embodiment, since the sunset determination (step S108) is performed based on the direct current value $I_{dc}$, and the sufficient sunset determination time $T_{ss}$ is set, the determination accuracy is advantageously high.

(Modification of Specific Processing of Embodiment)

Figure 4:
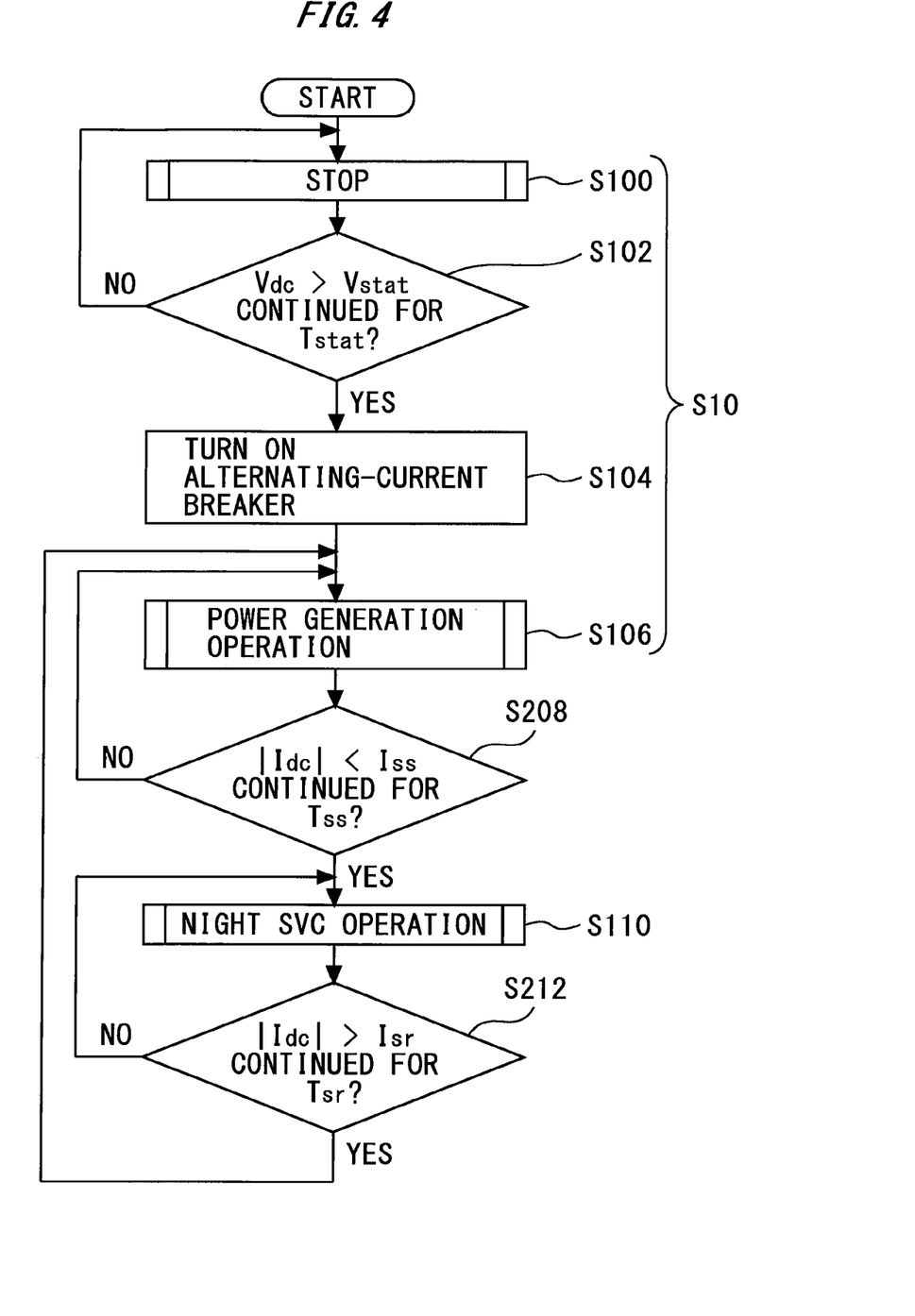
FIG. 4 is a flowchart schematically illustrating operation of a power converter according to a modification of the embodiment.

FIG. 4 is a flowchart schematically illustrating operation of a power converter according to a modification of the embodiment. As the modification of the embodiment, the control circuit 34 may perform the mode switching based on a result of comparison between the absolute value $|I_{dc}|$ of the direct current value $I_{dc}$ and a predetermined determination value. In other words, the processing in steps S108 and S112 in FIG. 2 may be modified to processing in steps S208 and S212 to perform the comparison determination about the direct current absolute value $|I_{dc}|$.

In a case where the rectifying device is not provided or a rectifying function of the rectifying device is lowered due to any reason, the reverse current may flow when the direct-current ground fault occurs in the daytime. The direct current detector 20 detects the value of the reverse current as a minus value. In this respect, in the modification in FIG. 4, a large reverse current when the direct-current ground fault occurs can be eliminated by using the direct current absolute value $|I_{dc}|$. This allows for accurate detection of the sunset.

Note that, as another modification of the embodiment, the processing in one of step S108 and step S112 described above may be deformed to the voltage detection based not on the direct current value $I_{dc}$ but comparison between the direct-current voltage value $V_{dc}$ and various determination value. The various determination value may be one of the predetermined sunset determination voltage value $V_{ss}$ and the predetermined sunrise determination voltage value $V_{sr}$. In this case, the reverse current is suppressed by the provided rectifying device 30. Therefore, the sunset determination time $T_{ss}$ may be lengthened to enhance the determination accuracy. The sunset determination time $T_{ss}$ may be, for example, two or more minutes, or an optional time determined within a range from two minutes to ten minutes.

Note that "another power converter" in which the processing in both of steps S108 and S112 described above is replaced with the voltage detection based on the direct-current voltage value $V_{dc}$ may be provided. In this case, the reverse current is suppressed by the provided rectifying device 30. Therefore, the sunset determination time $T_{ss}$ may be lengthened. The sunset determination time $T_{ss}$ may be, for example, an optional time of two or more minutes, or an optional time determined within a range from two minutes to ten minutes.

REFERENCE SIGNS LIST

2 Solar cell panel
2a Output terminal
2b Output terminal
4 Power system
6 Transformer
10 Power converter
12 Power conversion circuit
12a Switching device
12b, 30 Rectifying device
14 Direct-current capacitor
16 Filter circuit
16a Inductor
16b Capacitor
18 Direct-current voltage detector
20 Direct current detector
22a to 22c Alternating-current voltage detector
24a to 24c Alternating current detector
26a, 26b Direct-current switch (direct-current breaker)
28a to 28c Alternating-current switch (alternating-current breaker)
34 Control circuit
$I_{dc}$ Direct current value
$V_{dc}$ Direct-current voltage value

The invention claimed is:

1. A power converter, comprising:
a power conversion circuit including a direct-current terminal connected to a solar cell panel, and an alternating-current terminal connected to an alternating-current power system, the power conversion circuit being configured to convert direct-current power generated by the solar cell panel into alternating-current power and to supply the alternating-current power to the alternating-current power system;
a current detection unit configured to detect a direct current flowing between the solar cell panel and the power conversion circuit; and
a control circuit including a power generation mode in which the control circuit controls the power conversion circuit to output active power of the direct-current power generated by the solar cell panel to the alternating-current power system, and a reactive power compensation mode in which the control circuit controls the power conversion circuit to output reactive power to the alternating-current power system, the control circuit being configured to perform mode switching between the power generation mode and the reactive power compensation mode based on a magnitude of the direct current detected by the current detection unit,
wherein the mode switching includes sunset mode switching in which the mode is switched from the power generation mode to the reactive power compensation mode, and
the control circuit performs the sunset mode switching based on a length of a time period during which the magnitude of the direct current is lower than a predetermined sunset determination current value.

2. The power converter according to claim 1, further comprising a rectifying device provided between the solar cell panel and the power converter, the rectifying device being configured to suppress backflow of power to the solar cell panel, wherein
the current detection unit detects a current flowing from the solar cell panel into the power conversion circuit, as a plus current,
the control circuit performs the sunset mode switching in a case where the length of the time period during which the value of the direct current is lower than the sunset determination current value reaches a predetermined sunset determination time, and
the sunset determination time is a predetermined time of two or more minutes.

3. A power converter, comprising:
a power conversion circuit including a direct-current terminal connected to a solar cell panel, and an alternating-current terminal connected to an alternating-current power system, the power conversion circuit being configured to convert direct-current power generated by the solar cell panel into alternating-current power and to supply the alternating-current power to the alternating-current power system;

a current detection unit configured to detect a direct current flowing between the solar cell panel and the power conversion circuit; and a control circuit including a power generation mode in which the control circuit controls the power conversion circuit to output active power of the direct-current power generated by the solar cell panel to the alternating-current power system, and a reactive power compensation mode in which the control circuit controls the power conversion circuit to output reactive power to the alternating-current power system, the control circuit being configured to perform mode switching between the power generation mode and the reactive power compensation mode based on a magnitude of the direct current detected by the current detection unit, wherein the mode switching includes sunrise mode switching in which the mode is switched from the reactive power compensation mode to the power generation mode, and the control circuit performs the sunrise mode switching based on a length of a time period during which a value of the direct current exceeds a predetermined sunrise determination current value.

4. A power converter, comprising:

a power conversion circuit including a direct-current terminal connected to a solar cell panel, and an alternating-current terminal connected to an alternating-current power system, the power conversion circuit being configured to convert direct-current power generated by the solar cell panel into alternating-current power and to supply the alternating-current power to the alternating-current power system;

a current detection unit configured to detect a direct current flowing between the solar cell panel and the power conversion circuit;

a control circuit including a power generation mode in which the control circuit controls the power conversion circuit to output active power of the direct-current power generated by the solar cell panel to the alternating-current power system, and a reactive power compensation mode in which the control circuit controls the power conversion circuit to output reactive power to the alternating-current power system, the control circuit being configured to perform mode switching between the power generation mode and the reactive power compensation mode based on a magnitude of the direct current detected by the current detection unit; and a direct-current capacitor to which a direct-current voltage input to the direct-current terminal of the power conversion circuit is applied, wherein the control circuit starts driving of the power conversion circuit based on a length of a time period during which a voltage value of the direct-current capacitor exceeds a predetermined activation determination value in a state where the power conversion circuit is stopped.

\* \* \* \* \*